United States Patent Office 2,908,311
Patented Oct. 13, 1959

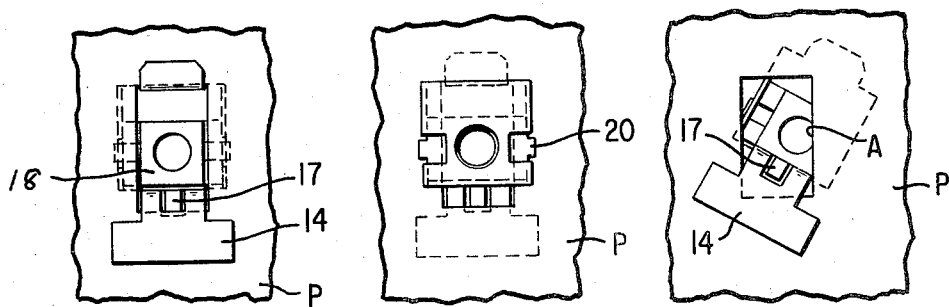
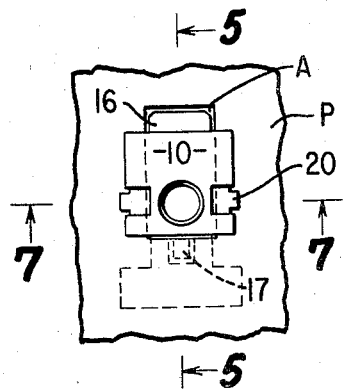
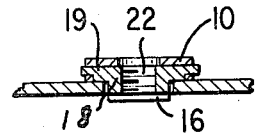
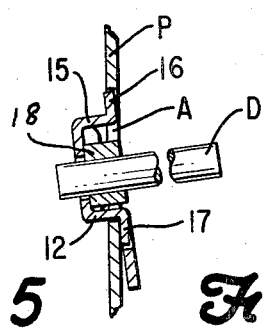
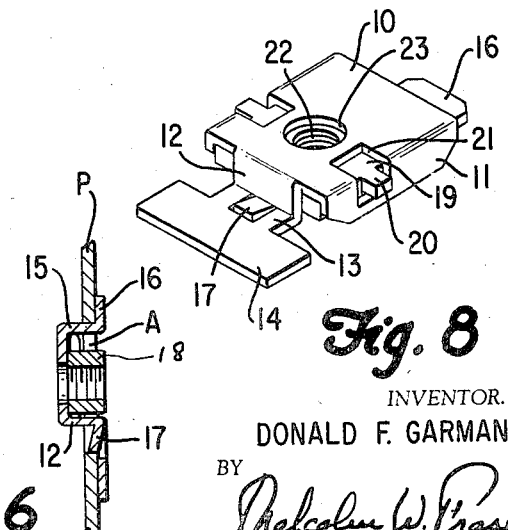

2,908,311

PANEL FASTENER HAVING A CAGED NUT AND CAGE WITH DETENT HOLDING MEANS

Donald F. Garman, Toledo, Ohio, assignor to Prestole Corporation, Toledo, Ohio, a corporation of Michigan Application July 19, 1957, Serial No. 672,951

1 Claim. (Cl. 151—41.75)

This invention relates to a sheet metal fastener applicable to an apertured panel in such manner that it is held in place in the aperture preparatory to receive a screw extending through an aperture in another panel for connecting the panels in assembled relation. Fasteners of this type are presently in use in large quantities in the automobile, refrigerator, and stove industries as well as elsewhere and are in the main satisfactory for the purpose. One such fastener is shown and described in United States Patent 2,273,648, dated February 17, 1942, entitled "Fastener."

An object of this invention is to improve fasteners of the above type so that they can be manufactured more efficiently in large quantities and can be applid to panels in position of use more easily and without liability of marring or scratching an enameled or painted panel surface.

Another object is to produce a panel fastener of the above type having a screw-receiving element which can shift or float to such position where it can receive the screw element without trouble or difficulty in spite of misalignment problems.

A further object is to produce a panel fastener equipped with a nut in which a substantial portion of the fastener is so disposed within the panel aperture that it blocks any tendency of the nut to turn when the screw is tightened, thereby obviating liability of the fastener becoming loosened from its supporting panel when a high torsional stress is imparted to the screw.

Other objects and advantages of the invention will hereinafter appear and for purposes of illustration but not of limitation, an embodiment of the invention is shown on the accompanying drawings in which Figure 1 is a plan view of the fastener applied to a panel, the latter being shown in fragment;

Figure 2 is a view similar to Figure 1 but showing the reverse side of the fastener;

Figure 3 is a bottom plan view of a fragment of the supporting panel showing one position of the fastener during the assembly operation;

Figure 4 is a view similar to Figure 3 showing the fastener in position prior to the final shifting movement thereof in attaching it to the panel;

Figure 5 is a sectional view generally along the lines of 5—5 of Figure 4 showing a drift pin in place to aid the fastener in its application to the panel;

Figure 6 is a view similar to Figure 5 but showing the fastener shifted to its final applied position on the supporting panel;

Figure 7 is a transverse sectional view substantially on the line 7—7 of Figure 4; and Figure 8 is an enlarged perspective view of the fastener.

The illustrated embodiment of the invention comprises a fastener having a flat sheet metal body portion 10 provided with a pair of relatively short parallel side flanges 11 which extend downwardly at substantially right angles to the body portion 10 and have the corners cut off. At one end of the body portion 10 is a relatively narrow end wall 12 which is turned downwardly at substantially right angles to the body 10 and depends approximately twice the depth of the flanges 11. Integral with the lower end of the wall 12 and extending laterally at right angles thereto is a neck portion 13 of substantially the same width as the wall 12. Integral with the neck portion 13 is a T-shaped terminal or handle portion 14 which forms a continuation of the neck portion but which extends laterally in opposite directions somewhat beyond the side walls or flanges 11.

At the opposite end of the body portion 10 is an end wall 15 which extends downwardly at substantially right angles to the body 10 and is of substantially the same width and length as the end wall 12. Integral with the end wall 15 and extending at right angles thereto and in alignment with the neck 13 and terminal portion 14 is a relatively short tongue 16, the corners of which are cut off at an angle.

Struck from the neck portion 13 and adjacent the wall 12 is a spring tongue-like detent arm 17 which normally extends upwardly at its free end slightly above the adjacent surface of the neck portion 13. The detent 17 is integral with the neck portion substantially at the juncture between the neck portion 13 and wall 12. The sides and free end of the detent are spaced slightly from the edges of the aperture from which the detent has been struck to afford free flexing movement.

Contained beneath the body portion 10 is a metallic nut 18 which is square and as shown is arranged closely to the inner side of the end wall 12, the opposite side of the nut being spaced substantially from the end wall 15. The nut 18 has a screw threaded hole 22 registering with a hole 23 in the fastener body 10. The ends of the shoulders 19 are flat and are disposed adjacent the side walls or flanges 11 respectively. The axial dimension of the nut body is approximately twice the depth of the flanges 11 and the thickness of the shoulders 19 is approximately equal to the depth of the flanges 11.

Cut out of a portion of the body portion 10 and adjacent portions of the side walls or flanges 11 is a pair of apertures 21 on opposite sides to receive laterally extending integral tabs 20 coined or otherwise pressed from the shoulders 19 of the nut. It will be observed that the tabs 20 are disposed at right angles to the axis of the nut body and are rectangular in shape. The tabs fit loosely in the cut out holes 21, thereby enabling floating or shifting movement of the nut axially and laterally relative to the sheet metal fastener body. This limited shifting or floating movement of the nut enables the nut to be shifted or canted relative to the body to receive a screw even though the parts to be joined are slightly out of alignment.

In applying the fastener to the supporting panel P, the terminal or handle portion 14 is grasped and the fastener is inserted through the longer dimension of the oblong fastener receiving opening A in the panel so that the shouldered portion 19 of the nut is lowermost. Thereafter the fastener is rocked to position the body 10 on the underside of the supporting panel, the reduced neck 13 enabling the fastener to be so positioned. The fastener is rocked to locate the tongue 16 in registry with the opening as indicated on Figure 4. In this position the spring detent 17 engages the underside of the panel P. By the use of a drift pin D inserted through the screw-threaded opening 22 of the nut and rocking the fastener so that the tongue 16 is on the upper side of the panel P as indicated on Figure 6, and then by shifting the fastener to bring the tongue 16 in the overlapping relation with the upper side of the panel and shifting to such a position that the detent 17 springs upwardly to the position shown in Figure 6 in which it abuts against the adjacent end edge of the panel aperture A. In this manner the end wall 15 abuts against one end of the panel aperture and the spring detent 17 abuts against the opposite edge of the panel aperture.

When the fastener is applied to the panel it will be observed that a portion of the nut 18 fits into the panel aperture A and the shoulders of the nut overlap the edges of the panel aperture. Any tendency of the fastener to turn relative to the panel P is blocked by the engagement between the sides of the nut and the edges of the aperture (see Figure 1). Sometimes in tightening a screw excessive torsion is exerted on the fastener which otherwise would cause the fastener to turn and separate from the panel but this difficulty is obviated in this fastener.

Not infrequently the holes in the two panels to be connected are not entirely in registry and it is impossible to insert the screw into the nut 18 of the fastener. This difficulty is to a large extent overcome in this fastener by mounting the nut 18 so that it floats relative to the fastener body and can thus be shifted to a position to receive the screw. In this manner difficulty heretofore encountered because of misalignment of panel holes is largely overcome.

The spring detent 17 overcomes difficulties heretofore experienced with non-yielding detents because in the latter case, enameled or painted surfaces have been marred or damaged by forcing the rigid detent thereover when the fastener is applied to the supporting panel. The spring detent 17 of this fastener yields sufficiently so that this trouble is not experienced and still the fastener is positively retained in applied position. Furthermore the spring detent facilitates the mounting of the fastener on the panel because it requires less effort to apply than in the case of the rigid detent.

Numerous changes in details of construction, arrangement and choice of materials may be effected without departing from the spirit of the invention especially as defined in the appended claim.

What I claim is:

A cage and caged nut adapted to be secured to a sheet metal panel having an elongate rectangular opening with side and end edges, comprising: a one-piece sheet metal cage having a flat rectangular top wall provided with a screw-receiving hole and having respectively opposed sides and ends corresponding to the side and end edges of the opening, the width of said top wall between the sides thereof being greater than the width of said opening between the side edges and the length of the top wall between the ends thereof being substantially less than the length of said opening between the end edges, integral downturned side walls on the opposite sides of said top wall, integral downturned end walls on the opposite ends of said top wall, said end walls being substantially narrower than the ends of said top wall and slightly narrower than the width of said opening, an integral flat neck extension on one end wall extending laterally outward at approximately a right angle thereto, an upwardly struck spring detent arm extending from said neck with the free end of said arm spaced from the adjacent end wall, the free end of said arm having a substantial rectilinear face which cooperates with a corresponding rectilinear end edge of the opening in the metal panel, a relatively wide flat handle integral with the outer end of said neck and disposed in the same plane therewith, said handle being of greater width than the width of said top wall, a flat tongue integral with the other end wall and projecting laterally outward at a right angle thereto and in the same plane as said neck and handle, there being an opposed pair of apertures extending through said top wall and adjacent portions of said side walls, the distance between the lower end of said one end wall and the outer end of said tongue being substantially equal to the length of said rectangular opening, and the distance between the lower end of said other end wall and the free end of said upwardly struck spring detent arm being normally slightly greater than the length of said opening; a rectangular nut engaged in said cage, said nut having a screw threaded hole registering beneath the hole in said top wall and having a top engaging beneath said top wall, a bottom, opposed pairs of sides and ends corresponding to the sides and ends of said top wall, the thickness of said nut measured from top to bottom being substantially equal to the depth of said end walls, a pair of shoulders extending laterally from the sides of said nut adjacent the top thereof, respectively, and engaging against the inner surfaces of the side walls of said cage, the depth of said shoulders being substantially equal to the depth of said side walls, the width of said nut in that portion thereof which lies beneath said shoulders being slightly less than the width of said opening, and an integral tab projecting laterally from each of said shoulders and loosely engaging through said opposed pair of apertures, the size of said apertures being somewhat larger than said tabs to afford a shifting movement of said nut relative to said cage between said end walls in a direction parallel to said side walls.

References Cited in the file of this patent

UNITED STATES PATENTS

| | | |
|---|---|---|
| 2,243,923 | Swanstrom | June 3, 1941 |
| 2,273,648 | Kost | Feb. 17, 1942 |
| 2,302,389 | Kost | Nov. 17, 1942 |
| 2,678,075 | Murphy | May 11, 1954 |
| 2,804,180 | Richardson | Aug. 27, 1957 |